US012793874B2

(12) United States Patent
Li et al.

(10) Patent No.: US 12,793,874 B2
(45) Date of Patent: Nov. 10, 2026

(54) MAGNETIC DECOUPLER

(71) Applicant: Dexter Magnetic Technologies, Inc., Elk Grove Village, IL (US)

(72) Inventors: Chun Li, Elk Grove Village, IL (US); Alana Toy, Elk Grove Village, IL (US); Ivan Ambriz, Elk Grove Village, IL (US)

(73) Assignee: DEXTER MAGNETIC TECHNOLOGIES, INC., Elk Grove Village, IL (US)

( * ) Notice: Subject to any disclaimer, the term of this patent is extended or adjusted under 35 U.S.C. 154(b) by 192 days.

(21) Appl. No.: 18/917,210

(22) Filed: Oct. 16, 2024

(65) Prior Publication Data

US 2026/0106062 A1 Apr. 16, 2026

(51) Int. Cl.
*H01F 7/02* (2006.01)
*H01F 7/20* (2006.01)

(52) U.S. Cl.
CPC ............... *H01F 7/021* (2013.01); *H01F 7/20* (2013.01)

(58) Field of Classification Search
CPC ................................... H01F 7/021; H01F 7/20
See application file for complete search history.

(56) References Cited

U.S. PATENT DOCUMENTS 5,959,520 A * 9/1999 Stelter ................... H01F 7/0278
335/306

FOREIGN PATENT DOCUMENTS

DE 102007002065 A1 * 7/2008 ............. H01F 7/021
WO WO-8102602 A1 * 9/1981 ......... E05B 73/0017

* cited by examiner

*Primary Examiner* — Mohamad A Musleh
(74) *Attorney, Agent, or Firm* — Boisbrun Hofman, PLLC

(57) ABSTRACT

An apparatus comprising a decoupler for releasing an antitheft device from a product to which the antitheft device is attached. The decoupler comprises a core, an annular magnet assembly, a nonmagnetic plate, and a permanently magnetic ring. The core comprises a permanently magnetic first core portion and a soft magnetic second core portion coaxial with the first core portion. The annular magnet assembly comprises a plurality of permanently magnetic segments collectively surrounding outer peripheries of the first and second core portions. The nonmagnetic plate abuts coplanar surfaces of the magnet assembly segments and the second core portion. The permanently magnetic ring abuts the nonmagnetic plate opposite the magnet assembly.

20 Claims, 5 Drawing Sheets

MAGNETIC DECOUPLER

BACKGROUND OF THE DISCLOSURE

Some loss-prevention measures include attaching a surveillance tag and/or other antitheft device to a protected product. Examples of such antitheft device include those that can be released from the protected product (e.g., at the point of sale) by utilizing a magnetic decoupler. The magnetic decouple is placed adjacent the antitheft device so as to actuate an internal mechanism of the antitheft device and thereby permit removal of the antitheft device from the consequently unprotected product.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus comprising a decoupler for releasing an antitheft device from a product to which the antitheft device is attached. The decoupler comprises a core, an annular magnet assembly, a nonmagnetic plate, and a permanently magnetic ring. The core comprises a permanently magnetic first core portion and a soft magnetic second core portion coaxial with the first core portion. The annular magnet assembly comprises a plurality of permanently magnetic segments collectively surrounding outer peripheries of the first and second core portions. The nonmagnetic plate abuts coplanar surfaces of the magnet assembly segments and the second core portion. The permanently magnetic ring abuts the nonmagnetic plate opposite the magnet assembly.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
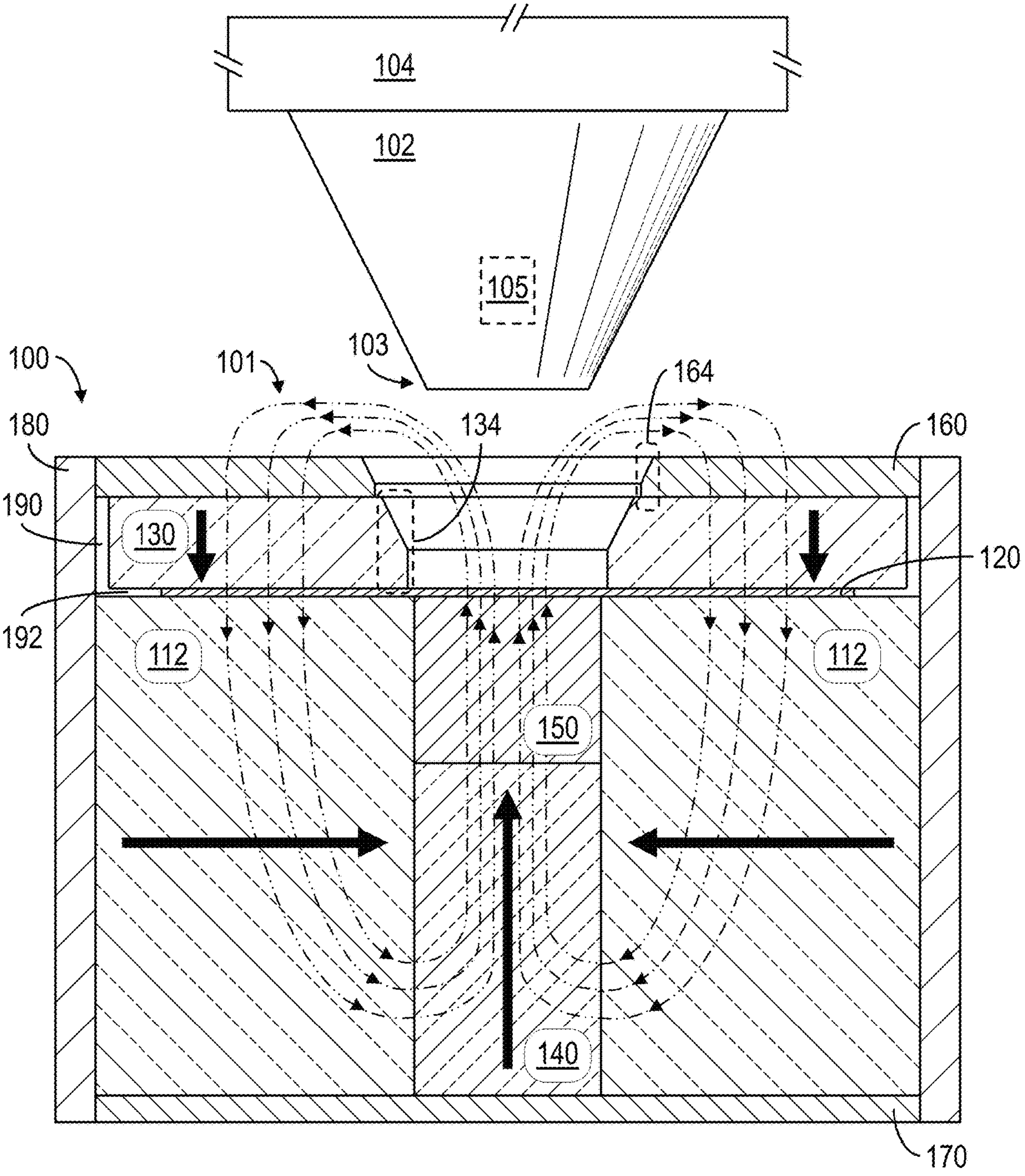
FIG. 1 is a sectional view of at least a portion of an example implementation of a decoupler according to one or more aspects introduced in the present disclosure.

The following disclosure provides many different examples for different features of various implementations. Specific examples of components and arrangements are described below to simplify the present disclosure. These are merely examples and are not intended to be limiting. In addition, the present disclosure may repeat reference numerals and/or letters in the various examples. This repetition is for simplicity and clarity, and does not in itself dictate a relationship between the various examples and/or configurations described. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

Figure 2:
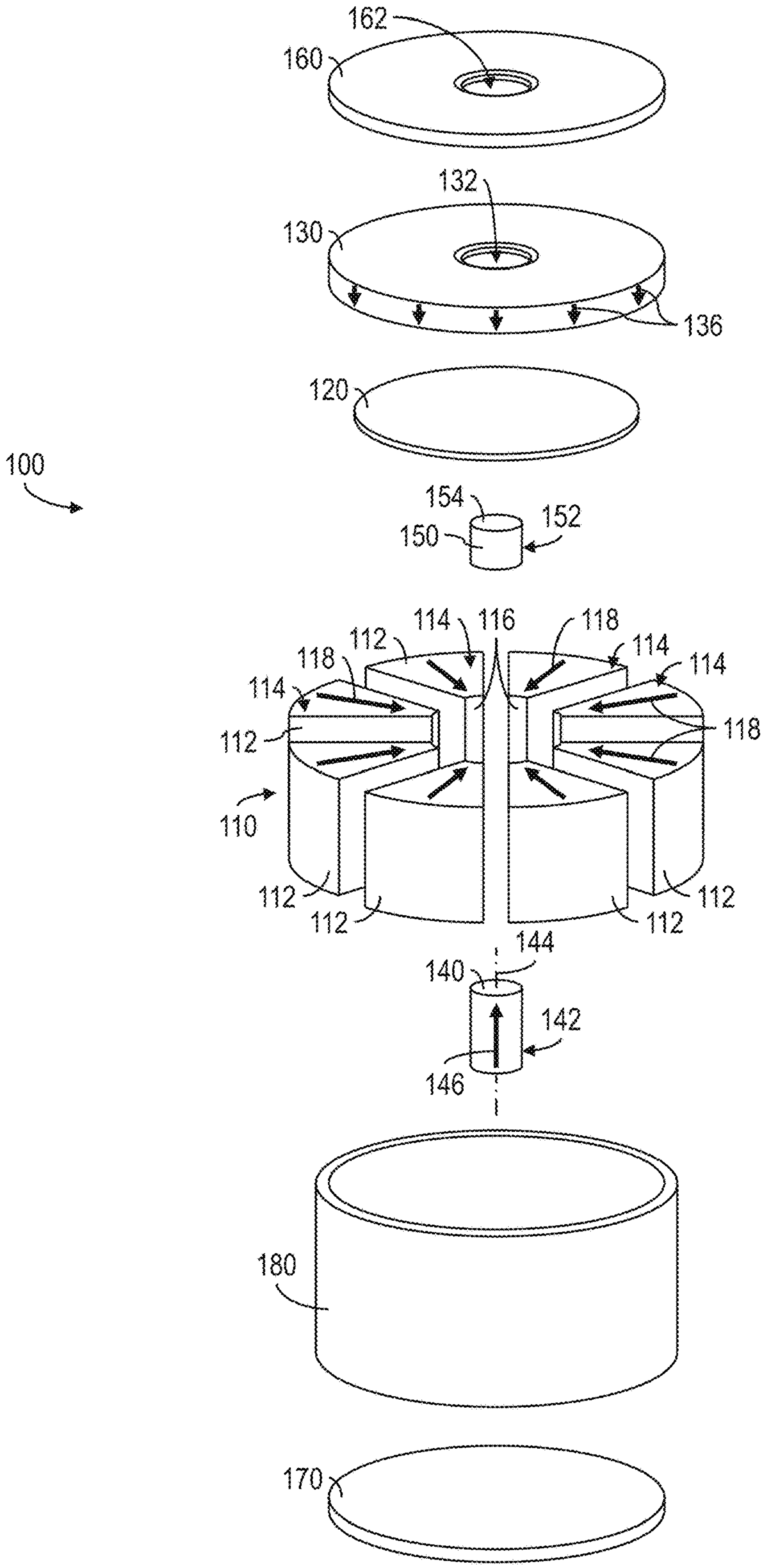
FIG. 2 is an exploded perspective view of the decoupler shown in FIG. 1.

FIG. 1 is a sectional view of at least a portion of an example implementation of a decoupler 100 according to one or more aspects introduced in the present disclosure. FIG. 2 is an exploded perspective view of the decoupler 100. The decoupler 100 is utilized for releasing an antitheft device 102 from a product 104 to which the antitheft device 102 is attached. The following description refers to FIGS. 1 and 2, collectively.

The decoupler 100 comprises a core, an annular magnet assembly 110, a nonmagnetic plate 120, and a permanently magnetic ring 130. The permanently magnetic ring 130 abuts the nonmagnetic plate 120 opposite the magnet assembly 110. The core comprises a permanently magnetic first core portion 140 and a soft magnetic second core portion 150, the first and second core portions 140, 150 being coaxial. The annular magnet assembly 110 comprises a plurality of permanently magnetic segments 112 collectively surrounding (and perhaps abutting) an outer periphery 142 of the first core portion 140 and an outer periphery 152 of the second core portion 150. The nonmagnetic plate 120 abuts surfaces 114 of the magnet assembly segments 112 and a surface 154 of the second core portion 150. The surfaces 114, 154 abutting the nonmagnetic plate 120 may be coplanar.

The first core portion 140 has a central longitudinal axis 144 and a magnetic orientation 146 coincident with the axis 144. Each magnet assembly segment 112 has a radially inward magnetic orientation 118 perpendicular to the first core portion axis 144. The magnetic ring 130 has a magnetic orientation 136 opposite to the magnetic orientation 146 of the first core portion 140. The magnetic orientations 146, 118, 136 of the respective first core portion 140, magnetic segments 112, and magnetic ring 130 cooperate to establish a magnetic field depicted in FIG. 1 by flux lines 101.

The first core portion 140, the magnet assembly segments 112, and the ring 130 may be formed of neodymium, samarium cobalt, aluminum nickel cobalt, ferrite/ceramic, alloys thereof, and/or other permanently magnetic materials. However, aluminum nickel cobalt (for example) may not be ideal for some implementations, such as implementations in which the permanently magnetic materials have a coercivity not less than about 20 kilo oersteds (kOe), perhaps nearing 30 kOe, and/or in implementations in which the permanently magnetic components 140, 112, 130 each have a substantially linear B-H curve (which plots the relationship between each permanent magnet's magnetic flux density "B" and magnetic field strength "H"). Additionally, the residual induction of ferrite/ceramic materials (e.g., about 0.4 tesla ("T")) may be too low for some implementations, such as implementations in which the permanently magnetic materials have at least two or three times the residual induction of ferrite/ceramic (e.g., implementations utilizing an "NdFeB" alloy of neodymium, iron, and boron, such as may have a residual induction of about 1.4 T). The ferrite/ceramic materials may also have too low of a flux density output for some implementations. Moreover, the permanently magnetic material of the first core portion 140, the magnet assembly segments 112, and the ring 130 may be a "square" magnetic material having a substantially straight line in the second quadrant of the hysteresis curve, where the intrinsic coercivity value exceeds the value of residual induction, such that the permanently magnetic components 140, 112, 130 do not demagnetize neighboring ones of the permanently magnetic components 140, 112, 130.

The soft magnetic material of the second core portion 150 channels the magnetic flux 101 to intensify the magnetic field that activates the antitheft device 102. The second core portion 150 may be formed of iron, low-carbon steel, iron-silicon alloy, iron-aluminum(-silicon) alloy, nickel-iron alloy, cobalt-iron alloy ("CoFe"), ferrite, allows thereof, and/or other soft magnetic materials. That is, the second core portion 150 is not permanently magnetic, but is able to be magnetized, having a positive (i.e., >0) coercivity not greater than about 1,000 Oe. However, some implementations require the soft magnetic material of the second core portion 150 to have a high saturation magnetization (flux density) "Bs" such that, for example, CoFe or low-carbon steel are utilized to form the second core portion 150.

Figure 3:
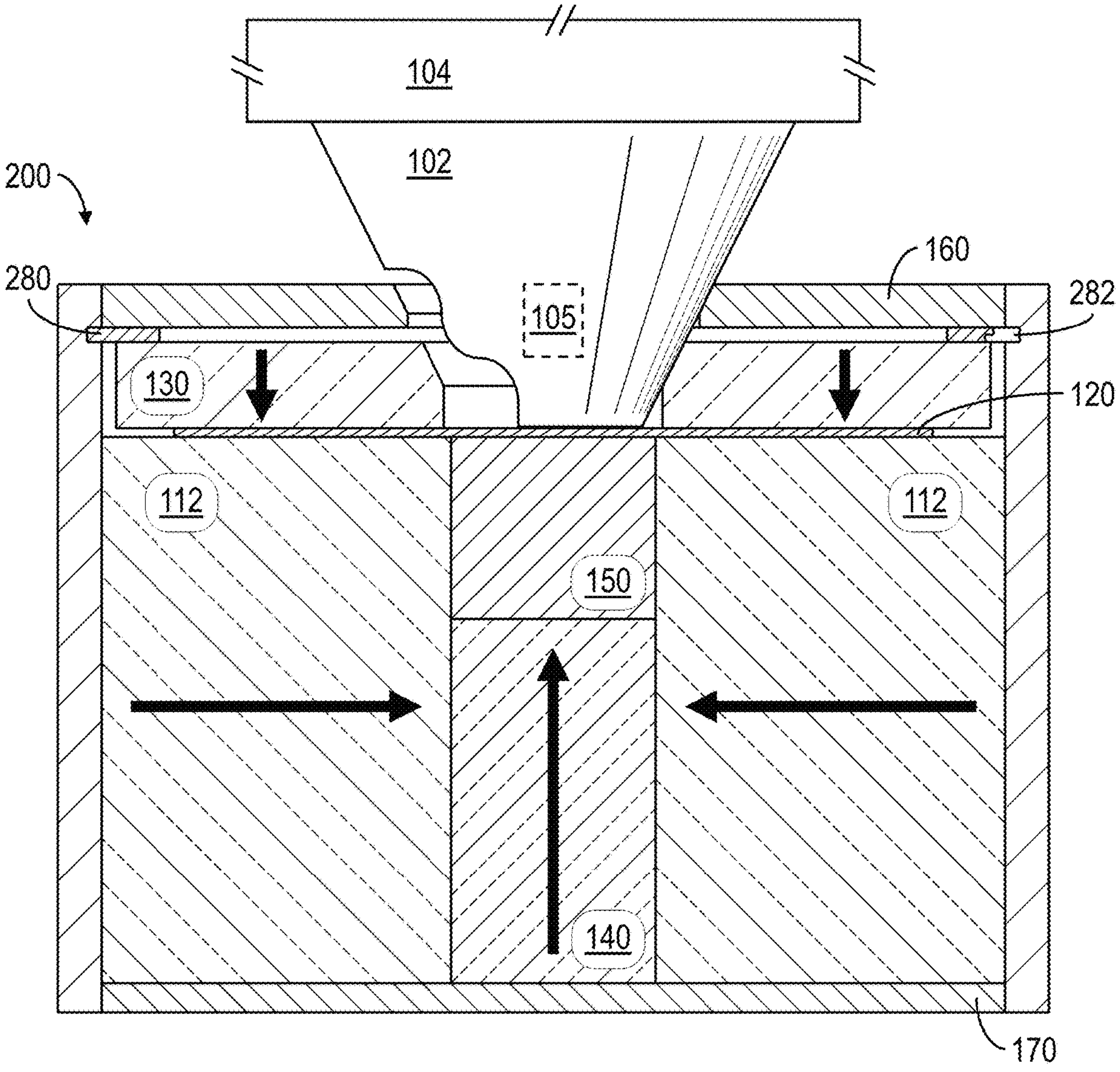
FIG. 3 is a sectional view of at least a portion of another example implementation of a decoupler according to one or more aspects introduced in the present disclosure.

The magnetic ring 130 is disc-shaped with a central opening 132. The central opening 132 may have a diameter that is not less than a diameter of the second core portion 150, such as may permit the passage of a tapered and/or otherwise-shaped end 103 of the antitheft device 102 toward and perhaps into contact with the nonmagnetic plate 120 (e.g., as depicted in FIG. 3). The central opening 132 may also have a tapered and/or otherwise-shaped internal profile 134 corresponding to a similarly tapered and/or otherwise-shaped external profile of the antitheft device end 103, such as may aid in more precisely orienting the antitheft device 102 relative to the maximum magnetic flux of the decoupler 100.

The second core portion 150 abuts the first core portion 140 within the interior space collectively defined by the inner radii 116 of the magnetic segments 112. The abutting surfaces of the first and second core portions 140, 150 are planar. The first and second core portions 140, 150 may each be cylindrical, perhaps having the same outer diameter.

The decoupler 100 may further comprise a soft magnetic cover 160 abutting the magnetic ring 130 opposite the plate 120. The cover 160 has a central opening 162 not smaller than the central opening 132 of the magnetic ring 130 so as to permit the passage of the antitheft device end 103. The central opening 162 may also have a tapered and/or otherwise-shaped internal profile 164 corresponding to the external profile of the antitheft device end 103, such as may further aid in orienting the antitheft device 102 relative to the maximum magnetic flux of the decoupler 100.

The decoupler 100 may further comprise a nonmagnetic base 170 abutting the magnet assembly 110 and the first core portion 140 opposite the plate 120. A cylindrically annular outer housing 180 may surround the base 170, the magnet assembly 110, the plate 120, the magnetic ring 130, and the cover 160. In an example implementation, the magnet assembly 110 has an outer diameter of 50 millimeters (mm) and a height of 30 mm, the first and second core portions 140, 150 each have an outer diameter of 12 mm, the first core portion 140 has a height of 25 mm, the second core portion 150 has a height of 12 mm, the plate 120 has a thickness of 1 mm, and the magnetic ring 130 has a thickness of 1 mm. However, these are merely example dimensions, it being understood that other specific and relative dimensions are also within the scope of the present disclosure.

In the example implementation depicted in FIG. 1, the magnetic ring 130 has an outer diameter that is less than (e.g., by 1-5%) an inner diameter of the housing 180, thus resulting in an annular gap 190 between the magnetic ring 130 and the housing 180. Similarly, the plate 120 has an outer diameter that is less than (e.g., by 10-20%) the inner diameter of the housing 180, thus resulting in an annular gap 192 between the magnetic ring 130 and the magnet assembly 110. These gaps 190, 192 are optional. However, including one or both of the gaps 190, 192 may aid in relaxing manufacturing tolerances and/or minimizing flux leakage.

Figure 4:
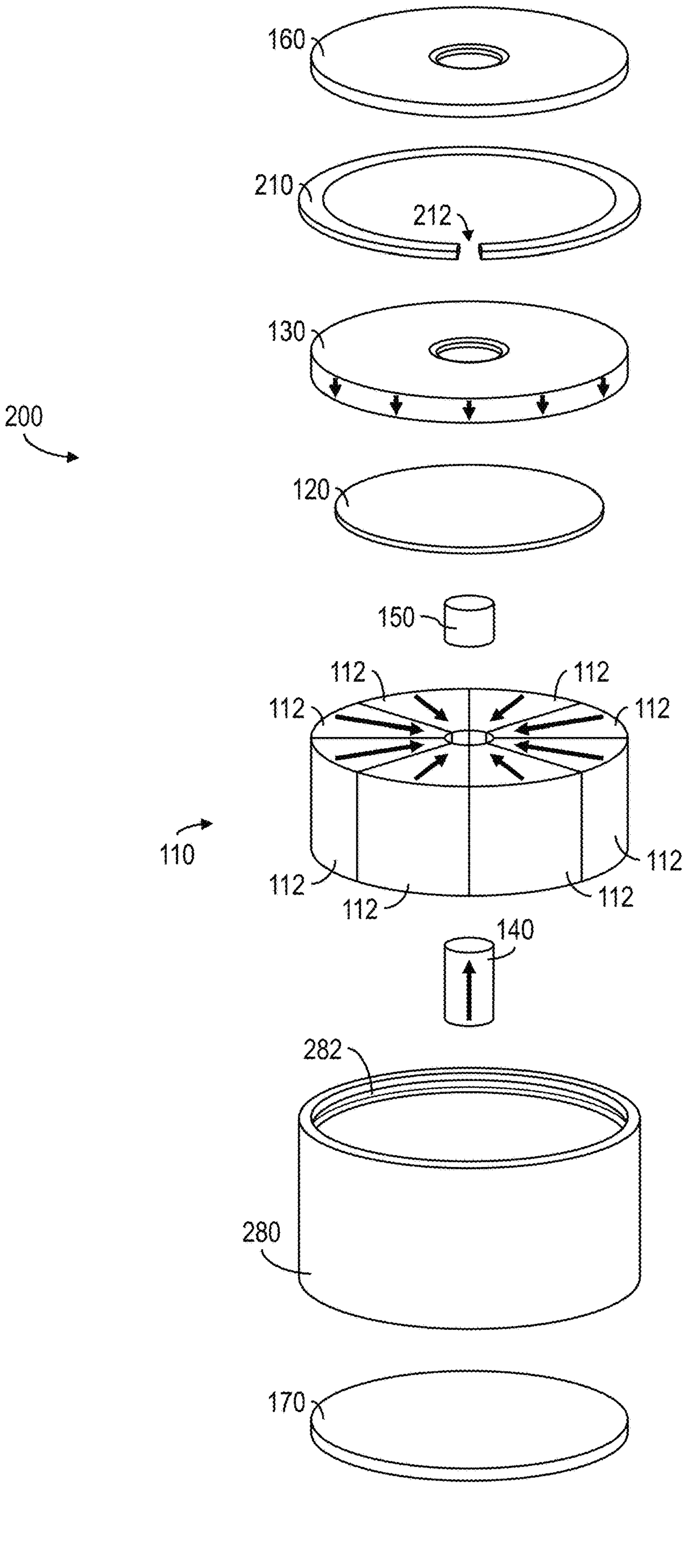
FIG. 4 is an exploded perspective view of the decoupler shown in FIG. 3.

FIG. 3 is a sectional view of at least a portion of another example implementation of a decoupler 200 according to one or more aspects introduced in the present disclosure. FIG. 4 is an exploded perspective view of the decoupler 200. The decoupler 200 is substantially the same as or similar to the decoupler 100 except as described below. The following description refers to FIGS. 3 and 4, collectively.

In addition to the magnet assembly 110, the plate 120, and the magnetic ring 130 of the example decoupler 100 depicted in FIGS. 1 and 2, the example decoupler 200 depicted in FIGS. 3 and 4 comprises at least one locking member 210 retaining the magnetic ring 130 against the plate 120. For example, as depicted in FIG. 4, the at least one locking member 210 may be a retaining ring formed from spring steel and/or other elastic materials not deformable by the magnetic forces of the neighboring components of the decoupler 200. The locking member 210 may comprise a gap 212 permitting temporary elastic contraction in order to install the locking member 210 in an internal groove 282 of the housing 280, which may otherwise be substantially the same as or similar to the housing 180 described above. The gap 212 may be minimized to the extent necessary for the locking member 210 to be sufficiently contracted in order to install the locking member 210 in the groove 282. Minimizing the size of the gap 212 may aid in reducing disruption of the intended magnetic flux created by the permanent and soft magnetic components of the decoupler 200.

The following description refers to FIGS. 1-4, collectively. Each magnet assembly segment 112 may generally resemble a trapezoidal prism turned onto one end but with the surface abutting the core being cylindrical, although other shapes are also within the scope of the present disclosure. Each segment 112 abuts both of an opposing pair of neighboring ones of the segments 112 such that the plurality of segments 112 collectively form a contiguous annular ring. The ring may have a generally cylindrical outer profile (e.g., as with the cylindrically annular magnet assembly 110 best shown in FIG. 4), although other annular ring shapes are also within the scope of the present disclosure. Moreover, while the magnet assembly 110 shown in FIGS. 1-4 is depicted as consisting of eight segments 112, the magnet assembly 110 of other implementations also within the scope of the present disclosure may have as few as two segments 112 or more than eight segments 112.

As shown in FIG. 3, utilization of the decouplers 100, 200 may entail inserting the end 103 of the antitheft device 102 through the openings 162, 132 of the cover 160 and the magnetic ring 130 until the antitheft device end 103 contacts the plate 120, thus bringing the antitheft device 102 as close as possible to the magnetic flux channeled by the second core portion 150. One or both of the internal profiles 134, 164 may cooperate with the external profile of the antitheft device 102 so as to orient an internal magnetic feature 105 of the antitheft device 102 substantially coaxial with the first and second core portions 140, 150 of the decouplers 100, 200, thus maximizing the effect of the magnetic flux channeled through the second core portion 150 on the magnetic feature 105. Alternatively, if one or both of the internal profiles 134, 164 are substantially cylindrical, their inner diameters may aid in such orientation of the antitheft device 102 relative to the first and second core portions 140, 150.

Figure 5:
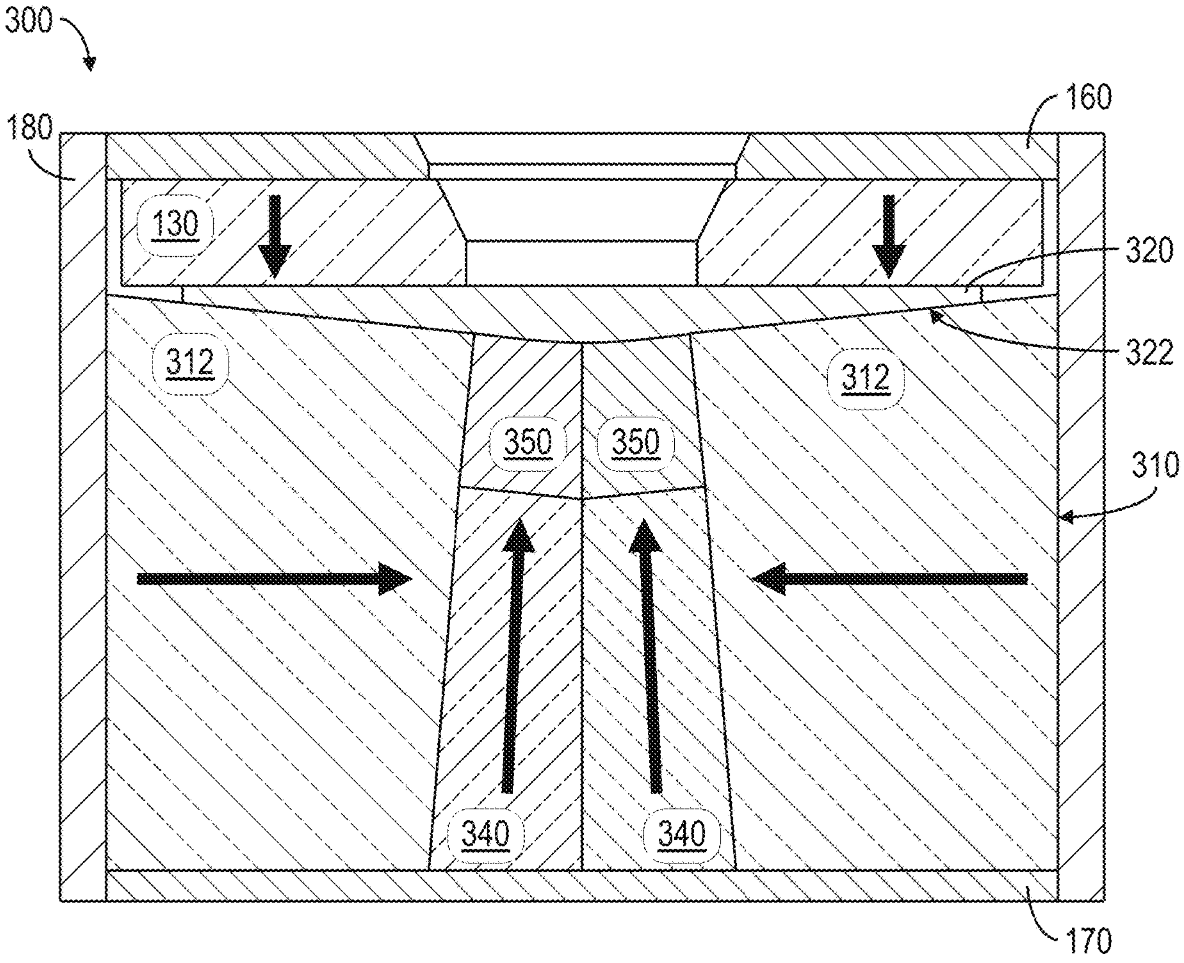
FIG. 5 is a sectional view of at least a portion of another example implementation of a decoupler according to one or more aspects introduced in the present disclosure.

FIG. 5 is a sectional view of at least a portion of another example implementation of a decoupler 300 according to one or more aspects introduced in the present disclosure. The decoupler 300 is substantially the same as or similar to the decoupler 100 shown in FIGS. 1 and 2, except as described below. Aspects described below with respect to the decoupler 300 are also applicable or readily adaptable for alternative implementations of the decouple 200 shown in FIGS. 3 and 4.

In the example implementations of the decouplers 100, 200 shown in FIGS. 1-4, the surfaces 114 of the magnet assembly segments 112 and the surface of the second core portion 150 abutting the plate 120 are coplanar. However, as depicted in FIG. 5, these surfaces may be conical or otherwise nonplanar in implementation in which the plate 120 is replaced by a circular member 320 having a nonplanar lower surface 322. Although not shown in the figures, the abutting surfaces of the plate/member 120, 320 and the magnetic ring 130 may also be nonplanar.

In the example implementations of the decouplers 100, 200 shown in FIGS. 1-4, the abutting surfaces of the first and second core portions 140, 150 are planar. However, as depicted in FIG. 5, the abutting surfaces of the first and second core portions 340, 350 may be conical or otherwise nonplanar.

Additionally, while the first and second core portions 140, 150 of the example implementations shown in FIGS. 1-4 are each cylindrical and of the same outer diameter, other implementations are also within the scope of the present disclosure. For example, as shown in FIG. 5, one or both of the first and second core portions 140, 150 may be substantially frustoconical.

A decoupler according to one or more aspects of the present disclosure, such as the example decoupler 100 depicted in FIGS. 1 and 2, the example decoupler 200 depicted in FIGS. 3 and 4, and/or the decoupler 300 depicted in FIG. 5, provides a powerful magnetic structure having a strong axial field as well as a strong magnetic field gradient. The strong magnetic field and its field gradient act together to generate a large region above the pole force with strong magnetic pull force.

For example, the radially oriented magnet segments 112, 312 of each magnet assembly 110, 310 provides a greater internal magnetic field (e.g., due to field superposition), which is intensified by the first core portion 140, 340. Additionally, the second, soft magnetic core portion 150, 350 can further increase the magnetic field due to high saturation magnetization of the soft magnetic materials. The second, soft magnetic core portion 150, 350, in combination with the first core portion 140, 340 and the magnet assembly 110, 310, also guides the magnetic flux 101 to the functional cavity of the decoupler 100, 200, 300 (i.e., as defined in part by the inner profile 134 of the magnetic ring opening 136 and the inner profile of the cover opening 162). The magnetic ring 130 also increases the magnetic field, as well as extending the range of the resulting magnetic pull force, making the decoupler more effective on antitheft devices 102 having magnetic clutch elements 105 that may be embedded internally further from the device end 103 (e.g., relative to other antitheft designs).

In view of the entirety of the present disclosure, a person having ordinary skill in the art will readily recognize that the present disclosure introduces an apparatus comprising a decoupler for releasing an antitheft device from a product to which the antitheft device is attached. The decoupler comprises a core, an annular magnet assembly, a nonmagnetic plate, and a permanently magnetic ring. The core comprises a permanently magnetic first core portion and a soft magnetic second core portion coaxial with the first core portion. The annular magnet assembly comprises a plurality of permanently magnetic segments collectively surrounding outer peripheries of the first and second core portions. The nonmagnetic plate abuts coplanar surfaces of the magnet assembly segments and the second core portion. The permanently magnetic ring abuts the nonmagnetic plate opposite the magnet assembly.

The surfaces of the magnet assembly segments and the second core portion abutting the nonmagnetic plate may be coplanar.

The decoupler may comprise at least one locking member retaining the permanently magnetic ring against the nonmagnetic plate. The at least one locking member may be a retaining ring.

Each magnet assembly segment may abut other opposing neighboring ones of the magnet assembly segments. In such implementations, among others also within the scope of the present disclosure, the magnet assembly may be cylindrically annular and/or the plurality of magnet assembly segments may consist of eight segments.

The second core portion may abut the first core portion. The abutting surfaces of the first and second core portions may be planar.

The first core portion may have a central longitudinal axis and a magnetic orientation coincident with the axis; each magnet assembly segment may have a radially inward magnetic orientation perpendicular to the first core portion axis; and the ring may be magnetically oriented opposite to the magnetic orientation of the first core portion.

The first and second core portions may each be cylindrical. In such implementations, among others also within the scope of the present disclosure, the first and second core portions may have the same outer diameter.

Each magnet assembly segment may abut an outer periphery of the first core portion and an outer periphery of the second core portion.

The ring may be disc-shaped with a central opening. The central opening may have a diameter not less than a diameter of the second core portion.

The ring may be disc-shaped with a central aperture, the decoupler may comprise a soft magnetic cover abutting the ring opposite the plate, and the cover may have a central opening not smaller than the central aperture of the ring. In such implementations, among others also within the scope of the present disclosure, the decoupler may comprise: a nonmagnetic base abutting the magnet assembly and the core opposite the plate; and a cylindrically annular outer housing surrounding the base, the magnet assembly, the plate, the ring, and the cover.

In an example implementation: the surfaces of the magnet assembly segments and the second core portion abutting the nonmagnetic plate are coplanar; the decoupler comprises a retaining ring retaining the permanently magnetic ring against the nonmagnetic plate; each magnet assembly segment abuts other opposing neighboring ones of the magnet assembly segments; the second core portion abuts the first core portion; the first core portion has a central longitudinal axis and a magnetic orientation coincident with the axis;

each magnet assembly segment has a radially inward magnetic orientation perpendicular to the first core portion axis; the ring is magnetically oriented opposite to the magnetic orientation of the first core portion; the first and second core portions are each cylindrical; each magnet assembly segment abuts an outer periphery of the first core portion and an outer periphery of the second core portion; the ring is disc-shaped with a central aperture, the central aperture having a diameter not less than a diameter of the second core portion; and the decoupler comprises a soft magnetic cover abutting the ring opposite the plate, the cover having a central opening not smaller than the central aperture of the ring. In such implementation, among others also within the scope of the present disclosure: the magnet assembly is cylindrically annular; the plurality of magnet assembly segments consists of eight segments; abutting surfaces of the first and second core portions are planar; and the first and second core portions have the same outer diameter. Such decoupler may comprise: a nonmagnetic base abutting the magnet assembly and the core opposite the plate; and a cylindrically annular outer housing surrounding the base, the magnet assembly, the plate, the ring, and the cover.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus, comprising:

a decoupler for releasing an antitheft device from a product to which the antitheft device is attached, the decoupler comprising:
- a core comprising:
  - a permanently magnetic first core portion; and
  - a soft magnetic second core portion coaxial with the first core portion;
- an annular magnet assembly comprising a plurality of permanently magnetic segments collectively surrounding outer peripheries of the first and second core portions;
- a nonmagnetic plate abutting coplanar surfaces of the magnet assembly segments and the second core portion; and
- a permanently magnetic ring abutting the nonmagnetic plate opposite the magnet assembly.

2. The apparatus of claim 1 wherein the surfaces of the magnet assembly segments and the second core portion abutting the nonmagnetic plate are coplanar.

3. The apparatus of claim 1 wherein the decoupler further comprises at least one locking member retaining the permanently magnetic ring against the nonmagnetic plate.

4. The apparatus of claim 3 wherein the at least one locking member is a retaining ring.

5. The apparatus of claim 1 wherein each magnet assembly segment abuts other opposing neighboring ones of the magnet assembly segments.

6. The apparatus of claim 5 wherein the magnet assembly is cylindrically annular.

7. The apparatus of claim 5 wherein the plurality of magnet assembly segments consists of eight segments.

8. The apparatus of claim 1 wherein the second core portion abuts the first core portion.

9. The apparatus of claim 8 wherein abutting surfaces of the first and second core portions are planar.

10. The apparatus of claim 1 wherein:

the first core portion has a central longitudinal axis and a magnetic orientation coincident with the axis;

each magnet assembly segment has a radially inward magnetic orientation perpendicular to the first core portion axis; and the ring is magnetically oriented opposite to the magnetic orientation of the first core portion.

11. The apparatus of claim 1 wherein the first and second core portions are each cylindrical.

12. The apparatus of claim 11 wherein the first and second core portions have the same outer diameter.

13. The apparatus of claim 1 wherein each magnet assembly segment abuts an outer periphery of the first core portion and an outer periphery of the second core portion.

14. The apparatus of claim 1 wherein the ring is disc-shaped with a central opening, the central opening having a diameter not less than a diameter of the second core portion.

15. The apparatus of claim 1 wherein:

the ring is disc-shaped having a central aperture; and the decoupler further comprises a soft magnetic cover abutting the ring opposite the plate, the cover having a central opening not smaller than the central aperture of the ring.

16. The apparatus of claim 15 wherein the decoupler further comprises:

a nonmagnetic base abutting the magnet assembly and the core opposite the plate; and a cylindrically annular outer housing surrounding the base, the magnet assembly, the plate, the ring, and the cover.

17. The apparatus of claim 1 wherein:

the surfaces of the magnet assembly segments and the second core portion abutting the nonmagnetic plate are coplanar;

the decoupler further comprises a retaining ring retaining the permanently magnetic ring against the nonmagnetic plate;

each magnet assembly segment abuts other opposing neighboring ones of the magnet assembly segments;

the second core portion abuts the first core portion;

the first core portion has a central longitudinal axis and a magnetic orientation coincident with the axis;

each magnet assembly segment has a radially inward magnetic orientation perpendicular to the first core portion axis;

the ring is magnetically oriented opposite to the magnetic orientation of the first core portion;

the first and second core portions are each cylindrical;

each magnet assembly segment abuts an outer periphery of the first core portion and an outer periphery of the second core portion;

the ring is disc-shaped with a central aperture, the central aperture having a diameter not less than a diameter of the second core portion; and the decoupler further comprises a soft magnetic cover abutting the ring opposite the plate, the cover having a central opening not smaller than the central aperture of the ring.

18. The apparatus of claim 17 wherein:

the magnet assembly is cylindrically annular;

the plurality of magnet assembly segments consists of eight segments;

abutting surfaces of the first and second core portions are planar; and the first and second core portions have the same outer diameter.

19. The apparatus of claim 18 wherein the decoupler further comprises a nonmagnetic base abutting the magnet assembly and the core opposite the plate.

20. The apparatus of claim 19 wherein the decoupler further comprises a cylindrically annular outer housing surrounding the base, the magnet assembly, the plate, the ring, and the cover.

* * * * *